June 24, 1930. H. L. CAVANAGH 1,765,482

METHOD FOR PROMOTING DATE CULTURE

Filed Aug. 2, 1927

INVENTOR.
Hubert L. Cavanagh
BY
ATTORNEYS.

Patented June 24, 1930

1,765,482

UNITED STATES PATENT OFFICE

HUBERT L. CAVANAGH, OF INDIO, CALIFORNIA, ASSIGNOR OF ONE-HALF TO C. M. WESTCOTT, OF LOS ANGELES, CALIFORNIA

METHOD FOR PROMOTING DATE CULTURE

Application filed August 2, 1927. Serial No. 210,037.

In the culture of dates, it is common to pollenize the blossoms by hand and in doing this I have discovered that it greatly increases the effect of the pollenization if after the pollen has been placed in the bunches of blossoms, each bunch is tied loosely for the purpose of holding the blossoms of each bunch in close relationship. In order to do this without repeated attention, I have provided a special device for tying each bunch so that it can be tied loosely and will yield under growth sufficiently to permit the necessary expansion. The blossoms at the time of pollenization stand upright in the palm and as they develop and expand they settle over until they hang downwardly at the end of the stem. It is desirable to hold the blossoms or stems together during the development and especially after they assume the downward position for otherwise the wind would separate them and tangle them with each other and with other branches and leaves of the palm and make it difficult and inconvenient in harvesting the dates after they ripen. By my improved process, I make it possible to get the very best results in the pollenization process and yieldingly hold the blossoms together during the further development, and, without injury thereto, allow the bunch to expand during its natural growth, so that when the dates are ready to be gathered, they are held together as a uniform bunch, free from entanglements of any kind.

In order to further explain my improved method and means for thus promoting date culture, I have illustrated the three stages of development on the accompanying sheet of drawings, which I will now describe:

Figure 1:
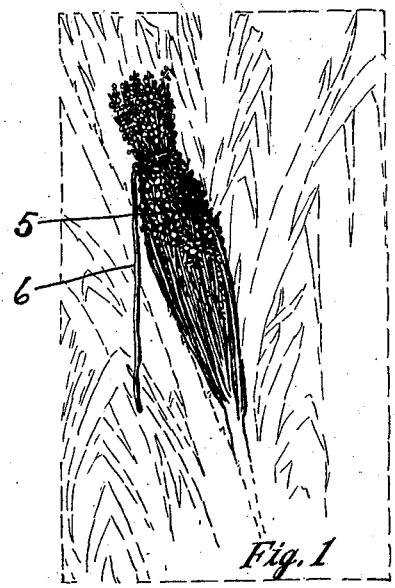
Figure 1 is a view showing a single bunch of blossoms of the date palm at the time of pollenization.

Referring more in detail to the drawings, Fig. 1, a single bunch of date blossoms is shown, designated 5, shown in an upright position just after the pollen has been placed down into the top of the bunch in the usual manner, and one of my tying devices, designated 6, is applied thereto.

Figure 2:
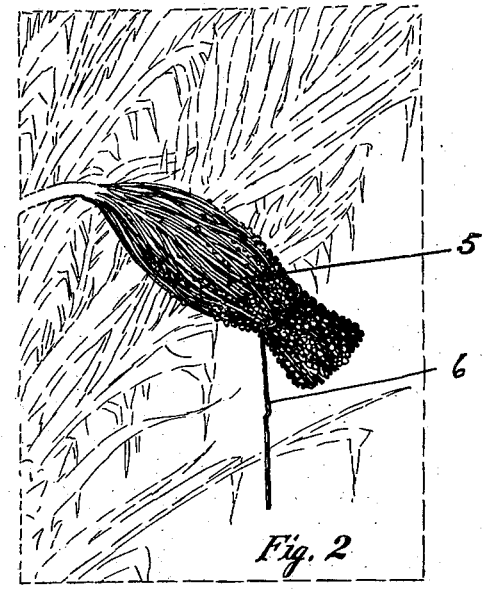
Figure 2 shows the same in further development and indicating how it gradually expands and settles over toward a downwardly hanging position.

In Fig. 2, the bunch of blossoms is shown some larger and commencing to overhang with its weight, the tying device having yielded to the natural growth and permitted the expansion without any injury to the blossoms or to the fruit.

Figure 3:
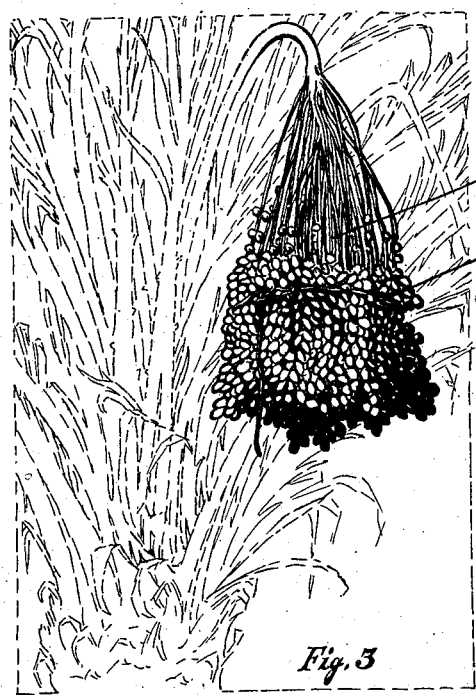
Figure 3 shows the same in further development and as it appears when ripe and ready to be gathered.

In Fig. 3, the bunch has developed to be a bunch of fruit instead of a bunch of blossoms and the separate stems are clearly seen with the dates thereon, and the tying device is shown still further expanded, and while holding the stems of dates together in clean, collected form, said device has permitted the natural expansion and adjustment to growth and ripening of the fruit ready to pick, and has prevented the stems from becoming blown about and tangled with each other and with the stems and leaves of the date palm, as is the case when nothing is used to prevent it.

There may be other growth which can be handled and protected in the same general manner and I do not limit my invention to date culture.

Figure 4:
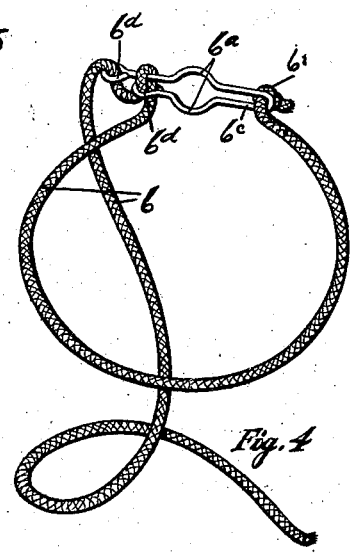
Figure 4 is a view showing one form of tying device for accomplishing my invention.

Referring now to Fig. 4, I have shown one simple form of tying device, but it is evident that many different forms of yielding cords or devices can be devised and which will answer the same purpose, but the form I have shown is easily applied and yields readily under the natural expansion without injury to blossom or fruit. The device as here illustrated comprises a wire loop or device having the bulge 6ª, through which a knot 6ᵇ can be inserted to be anchored in the end of the loop 6ᶜ, as shown, while the other end of the cord 6, is inserted through the eyes 6ᵈ, 6ᵈ, formed on the two free ends of the wire device, substantially as illustrated. There is just sufficient friction on the cord to permit it to be drawn by the pressure developed during the growth of the blossoms and fruit, and yet it is sufficient to hold the device in place and to hold the stems and blossoms nicely together, substantially in the manner illustrated in Figs. 1, 2 and 3.

I do not limit my invention to the kind of growth controlled or to the particular tying device, but intend to cover the method or process whereby such growth is held in desired form, permitted to grow and expand, and prevented from becoming entangled so as to make its harvesting more inconvenient, and to this end the following claims are submitted and made a part of this specification.

I claim:

1. The method of promoting the culture of growing clusters which includes yieldingly tying such a cluster to hold the same together while permitting expansion by growth and permitting said cluster to move from an upright to a down-hanging position.

2. The herein described method of promoting date culture which includes yieldingly tying a cluster of blossoms to hold the same together while permitting expansion by growth and permitting said cluster to move from an upright to a down-hanging position.

Signed at Indio, Riverside, California, this 22nd day of July, 1927.

HUBERT L. CAVANAGH.